(12) United States Patent
Ueda et al.

(10) Patent No.: US 8,909,456 B2
(45) Date of Patent: Dec. 9, 2014

(54) ENGINE CONTROL APPARATUS

(75) Inventors: Katsunori Ueda, Okazaki (JP); Satoshi Maeda, Okazaki (JP); Toshiyuki Miyata, Okazaki (JP); Koji Shibata, Okazaki (JP); Hiroaki Ueno, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 430 days.

(21) Appl. No.: 13/417,361

(22) Filed: Mar. 12, 2012

(65) Prior Publication Data

US 2012/0316758 A1 Dec. 13, 2012

(30) Foreign Application Priority Data

Jun. 7, 2011 (JP) ................................. 2011-127272

(51) Int. Cl.
| | |
|---|---|
| F02D 41/26 | (2006.01) |
| F02D 41/30 | (2006.01) |
| F02D 28/00 | (2006.01) |
| F02D 41/00 | (2006.01) |
| F02D 13/02 | (2006.01) |
| F02D 41/14 | (2006.01) |

(52) U.S. Cl.
CPC ........ F02D 41/0002 (2013.01); F02D 13/0207 (2013.01); F02D 13/0238 (2013.01); F02D 2041/001 (2013.01); F02D 2041/1412 (2013.01); F02D 2041/1431 (2013.01); F02D 2200/0402 (2013.01); F02D 2200/0411 (2013.01); F02D 2250/12 (2013.01); Y02T 10/42 (2013.01); Y02T 10/18 (2013.01)

USPC ........................................................ 701/105

(58) Field of Classification Search
USPC .......... 701/102, 103, 105, 109; 123/391–395, 123/399
See application file for complete search history.

(56) References Cited

U.S. PATENT DOCUMENTS

| | | | | |
|---|---|---|---|---|
| 4,962,742 | A * | 10/1990 | Nishizawa et al. | 123/492 |
| 6,014,955 | A * | 1/2000 | Hosotani et al. | 123/399 |
| 6,626,144 | B1 | 9/2003 | Kanamaru | |
| 7,107,140 | B2 * | 9/2006 | Yoshino et al. | 701/102 |
| 7,441,544 | B2 * | 10/2008 | Hagari | 123/434 |
| 7,769,523 | B2 * | 8/2010 | Matsushima et al. | 701/103 |
| 8,666,636 | B2 * | 3/2014 | Takahashi et al. | 701/103 |
| 2001/0013335 | A1 * | 8/2001 | Hosokawa et al. | 123/478 |
| 2001/0023686 | A1 * | 9/2001 | Okamoto et al. | 123/490 |

(Continued)

FOREIGN PATENT DOCUMENTS

| | | |
|---|---|---|
| CN | 1757895 A | 4/2006 |
| JP | 7-259621 A | 10/1995 |

(Continued)

Primary Examiner — John Kwon
Assistant Examiner — Johnny H Hoang
(74) Attorney, Agent, or Firm — Birch, Stewart, Kolasch & Birch, LLP

(57) ABSTRACT

An engine control apparatus includes a target air volume calculator which calculates a target air volume required by an engine, and an actual air volume calculator which calculates an actual air volume inhaled into a cylinder of the engine. The apparatus further includes an estimator which calculates the estimated value of subsequent actual air volume on the basis of a time lag from a time when the target air volume is calculated to a time when the actual air volume reaches the target air volume. The apparatus can accurately estimate an intake air volume inhaled into the cylinder to improve the controllability of the engine.

20 Claims, 4 Drawing Sheets

(56) References Cited

U.S. PATENT DOCUMENTS

| | | | |
|---|---|---|---|
| 2002/0124832 A1* | 9/2002 | Oota et al. | 123/480 |
| 2004/0024517 A1 | 2/2004 | Jankovic et al. | |
| 2004/0088101 A1* | 5/2004 | Muto | 701/103 |
| 2004/0107946 A1* | 6/2004 | Kobayashi et al. | 123/480 |
| 2004/0237917 A1* | 12/2004 | Yasui et al. | 123/90.15 |
| 2007/0088487 A1 | 4/2007 | Lahti et al. | |
| 2011/0191009 A1* | 8/2011 | Soejima | 701/103 |

FOREIGN PATENT DOCUMENTS

| | | |
|---|---|---|
| JP | 11-82102 A | 3/1999 |
| JP | 2000-80952 A | 3/2000 |
| JP | 2001-98998 A | 4/2001 |
| JP | 2008-297946 A | 12/2008 |

\* cited by examiner

ENGINE CONTROL APPARATUS

CROSS-REFERENCE TO THE RELATED APPLICATION

This application incorporates by references the subject matter of Application No. 2011-127272 filed in Japan on Jun. 7, 2011 on which a priority claim is based under 35 U.S.C. §119(a).

FIELD

The present invention relates to a control apparatus for controlling an engine by estimating an intake air volume inhaled into a cylinder.

BACKGROUND

Typical engine control requires control of fuel injection rate, intake air volume, ignition timing, and other operational parameters in response to output requirements for an engine. The fuel injection rate and intake air volume influence the air-to-fuel ratio, and the timing of ignition influences combustion efficiency and stability in a cylinder. Thus, the accuracy of calculating these control parameters significantly affects the output and emission performance of the engine.

A known calculating method used for such engine control is a differential estimation correction method. The differential estimation correction method extrapolates the slope of a variable actual intake air volume inhaled into a cylinder to estimate the subsequent intake air volume.

For example, Patent Document 1 (Japanese Laid-open Patent Application No. HEI-07-259621) discloses a technique which calculates the estimated value of the air volume inhaled into a cylinder, and then calculates the fuel injection rate on the basis of that estimated value for an engine control apparatus which injects fuel before the inlet stroke is finished.

This technique involves calculation of a difference between the latest intake air volume and the second latest intake air volume on the basis of a value detected by an air flow sensor which periodically detects the intake air volume for each engine rotation and estimation of the subsequent intake air volume through addition of the newest intake air volume to a value obtained by multiplying this difference by a predetermined estimation gain. Such a method can estimate an accurate intake air volume, and can prevent the variation of the air-to-fuel ratio and torque through the control of the fuel injection rate on the basis of the estimated intake air volume.

Unfortunately, in this predictive method, the accuracy of the estimated value may be decreased when the slope of the intake air volume varies. For example, FIGS. 4A, 4B are graphs showing examples of the variations of the actual intake air volume (actual air volume) and estimated value. In these graphs, the actual air volume for every stroke is calculated for a four-stroke four-cylinder engine wherein the estimated value is calculated two strokes before the actual air volume is calculated. The estimated value of the actual air volume is obtained by doubling the difference between the latest actual air volume and the second latest actual air volume (estimation gain is two) wherein the fuel injection rate is set on the basis of this estimated value.

FIG. 4A indicates a constant slope of the actual air volume, while FIG. 4B indicates a variable slope of the actual air volume. The horizontal axis of the graph represents time, in which vertical lines drawn for each half rotation (180 degrees) of a crankshaft indicate the boundaries of each stroke. The vertical axis of the graph corresponds to the air volume (the actual air volume, and the estimated value thereof). It should be noted that in the graphs, the thick solid line represents the actual air volume, the dashed line represents the estimated value thereof, and the thin solid line represents the actual air volume after two strokes.

Since the actual air volume does not vary from time $S_0$ to time $S_2$ in the graph, the estimated value is equal to the actual air volume. When the actual air volume varies after time $S_2$, the estimated value is calculated according to the variation. At that time, if the variation of the actual air volume per unit time is fixed, the increment from time $S_2$ to time $S_3$ is equal to the increment from time $S_3$ to time $S_4$ and the actual air volume hereinafter increases at a fixed rate. As a result, a value obtained by doubling the variation of the actual air volume per stroke is substantially equal to an increment of the actual air volume after two strokes at time $S_2$. In this way, the subsequent actual air volume can be estimated at a point two strokes before. In other words, as shown in FIG. 4A, the dashed line varies so as to follow the thin solid line after time $S_2$.

On the other hand, as shown in FIG. 4B, in the case that the variation of the actual air volume per unit time is not fixed, a gap is caused between the estimated value and the actual air volume after two strokes, the accuracy of the estimation of the actual air volume depends on the slope of the actual air volume after the actual air is estimated.

For example, between time $S_2$ and time $S_3$ where the slope of the actual air volume increases, a value obtained by doubling the variation, between time $S_2$ and time $S_3$, is calculated as the estimated value regardless of a subsequent increase in the actual intake air volume; hence the dashed line goes below the thin solid line, and the estimated value becomes smaller than the actual air volume after two strokes. A shaded area between time $S_0$ and time $S_3$ corresponds to the shortfall of the air volume as the estimated value. On the contrary, the slope of the actual air volume decreases after time $S_3$, and the dashed line goes over the thin solid line, so that the surplus of the air volume, shown by a shaded area, is included in the estimated value.

As described above, the conventional method in which the intake air volume is estimated on the basis of the slope of the actual air volume inhaled into the cylinder has a large estimation error. Unfortunately it is difficult to accurately estimate the intake air volume in a transient state in which the change rate of the intake air volume increases and decreases. The variation of the air-to-fuel ratio and torque caused by such a low estimation accuracy may result in low controllability of the engine.

SUMMARY

Technical Problems

An object of the present invention, which has been accomplished in view of the problem described above, is to accurately estimate the intake air volume inhaled into a cylinder to improve the controllability of an engine. It should be noted that, beside this object, function effects led by each configuration shown in the embodiments described below, and advantageous effects which are not attained in conventional techniques can be regarded as other objects of the present invention.

Solution to Problems (1) An engine control apparatus disclosed herein includes a target air volume calculator which calculates a target air volume required by an engine, an actual air volume calculator which calculates an actual air volume inhaled into a cylinder of the engine. The apparatus also includes an estimator which calculates the estimated value of the subsequent actual air volume (oncoming actual air volume, actual air volume in the future) as an estimated air volume on the basis of a time lag from a time when the target air volume is calculated to a time when the actual air volume reaches the target air volume.

The phrase "from a/the time when the target air volume is calculated to a/the time when the actual air volume reaches the target air volume" used here does not necessarily mean "to a/the time when the target air volume completely matches the actual air volume". It also involves a meaning of "to a/the time when the value of the actual air volume reaches the proximity of the target air volume. The word "time lag" used here means the length of time before the target air volume is reflected in the actual air volume from the time when the target air volume is calculated as a reference time (for example, drive delay time).

(2) Preferably, the apparatus further includes a memory which stores the history of the target air volume, wherein the estimator preferably calculates the estimated air volume on the basis of the history of the target air volume and the actual air volume.

(3) Preferably, the apparatus further includes an air inhalation controller which controls a throttle valve of the engine on the basis of the target air volume, wherein the memory preferably stores the history of a period of time corresponding to at least the drive delay time of the throttle valve as the history of the target air volume.

(4) The estimator preferably includes an estimation span calculator, a variation calculator, and an estimated air volume calculator. The estimation span calculator calculates a time span between a time when the estimated value is calculated and a subsequent time when the actual air volume may reach the estimated value. The variation calculator calculates the variation of the target air volume from a time earlier than the time when the estimated value is calculated to a time when the time span has passed, among the history stored by the memory. The estimated air volume calculator calculates the estimated air volume on the basis of the actual air volume and the variation.

(5) Preferably, the apparatus further includes a calculation cycle detector which detects the calculation cycle of the target air volume for the target air volume calculator, wherein the memory stores, as the history, the value of the change rate of the target air volume corresponding to a fixed cycle converted using the calculation cycle.

(6) Preferably the apparatus further includes a fuel controller which controls the fuel injection rate of the engine on the basis of the estimated air volume.

(7) Preferably the apparatus further includes an ignition controller which controls a timing of the ignition of the engine on the basis of the estimated air volume.

Advantageous Effects

The disclosed engine control apparatus can estimate the estimated air volume accurately taking into account the effect of the time lag of the actual air volume with respect to the target air volume using the actual air volume and the target air volume, and can improve the controllability of the engine.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

An engine control apparatus will be described with reference to the attached drawings. Note that the embodiment described below is merely illustrative. It should not be intended that a variety of modifications and the adaption of the technique which are not described in the embodiment described below are eliminated. Additionally, each configuration of the embodiments described below can be accepted or rejected as necessary or can be combined appropriately with others, a variety of modifications can be made without departing the spirit of the embodiment.

1. Apparatus Configuration

[1-1. Engine]

Figure 1:
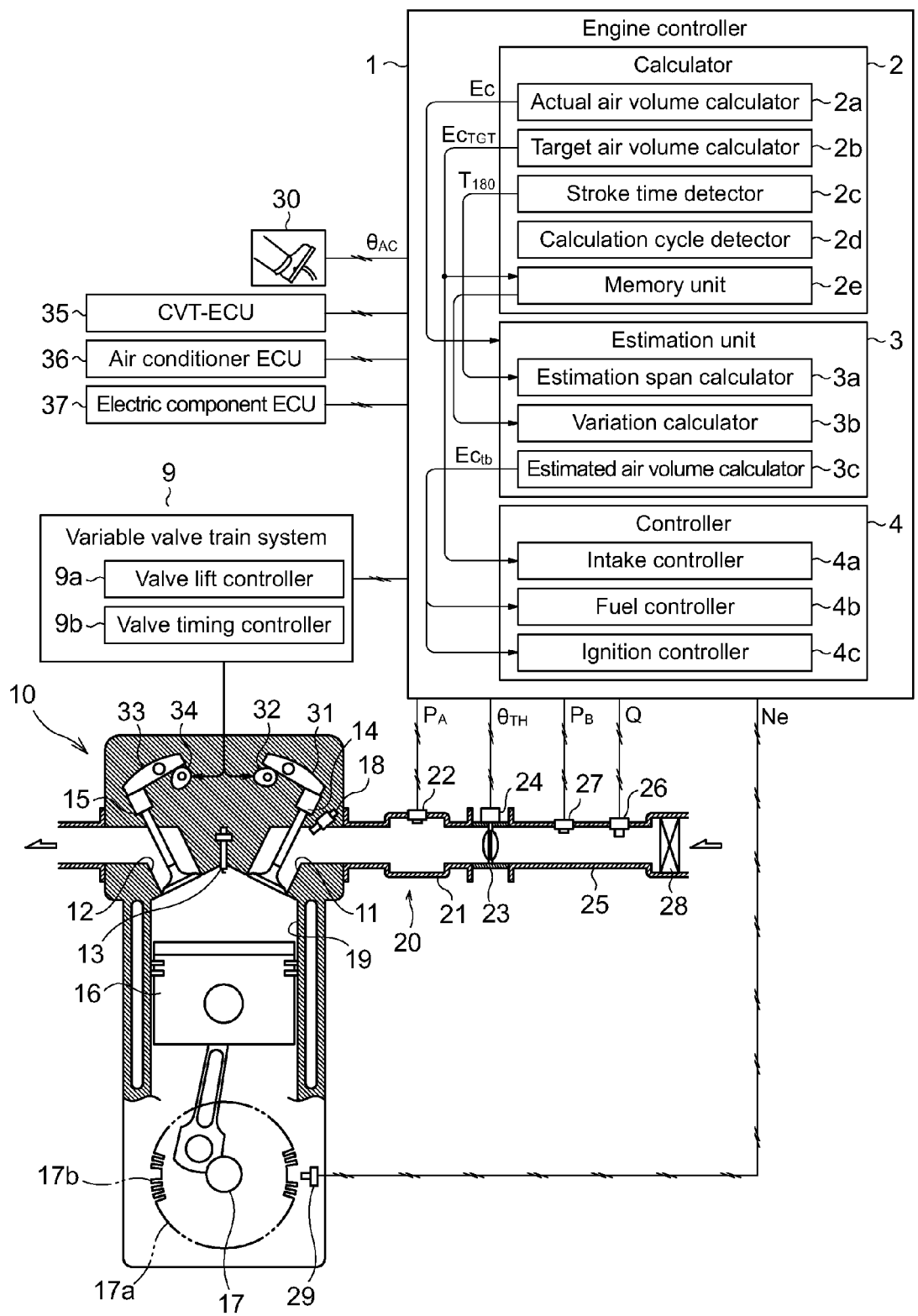
FIG. 1 is an overall configuration diagram of an engine control apparatus in accordance with one embodiment.

An engine control apparatus of the embodiment can be adapted to a four-cylinder engine 10 installed in an automotive vehicle. FIG. 1 shows one of the four cylinders 19 provided in the engine 10. A piston 16 sliding upwardly and downwardly in the cylinder 19 is connected to a crankshaft 17 with a connecting rod. On the top face in the combustion chamber of the cylinder 19, an intake port 11 and an exhaust port 12 are provided, and an end of a spark plug 13 protrudes toward a combustion chamber.

This engine 10 is of a four stroke type in which one combustion cycle proceeds, while the piston 16 reciprocates twice in the cylinder 19. The combustion cycle consists of four strokes which are, in the forward order, an inlet stroke, a compression stroke, a combustion stroke, and an exhaust stroke. One combustion cycle corresponds to two turns (720 degrees) of the crankshaft 17, and each stroke corresponds to a half turn (180 degrees) of the crankshaft 17.

The combustion cycles of four cylinders of the engine 10 are set such that they have a phase difference for the rotation angle of the crankshaft 17 one another. For example, among the four cylinders, a #1 cylinder through a #4 cylinder, when the inlet stroke starts with the #1 cylinder, the compression stroke starts with the #2 cylinder, the combustion stroke starts with the #4 cylinder, and the exhaust stroke starts with the #3 cylinder. Thus, 180 degree phase differences are set between the respective combustion cycles of these four cylinders. In this case, the combustion stroke starts with, in sequence, the #1 cylinder, the #3 cylinder, the #4 cylinder, and the #2 cylinder.

The combustion chamber has an intake valve 14 which opens or closes a gate to an intake port 11, and an exhaust valve 15 which opens or closes a gate to an exhaust port 12 on the top face on the side of the cylinder head. Additionally, an injector 18 which injects fuel is provided in the intake port 11. The intake port 11 is communicated with or closed off from the combustion chamber by opening and closing the intake valve 14, while the exhaust port 12 is communicated with or closed off from the combustion chamber by opening and closing the exhaust valve 15.

The upper ends of the intake valve 14 and the exhaust valve 15 are each connected to the one ends of the corresponding rocker shafts. The rocker shaft is a rocking member which is rotatably supported by a rocker arm. The other ends of the rocker shafts are connected to cams which are rotatably supported by camshafts. The rocking pattern of the rocker shafts thus depend on the shape of the cams (cam profile).

[1-2. Valve Train]

The engine 10 is provided with a variable valve train system 9 which controls the operation of the rocker arms 31, 33 and the cams 32, 34. The variable valve train system 9 changes the maximum valve lift and the valve timing independently or dependently for each of the intake valve 14 and the exhaust valve 15. The variable valve train system 9 includes a valve lift controller 9a and a valve timing controller 9b as a mechanism for changing the amount and time of rocking of the rocker arms 31, 33.

The valve lift controller 9a is a mechanism which continuously changes the maximum valve lift of the intake valve 14 and the exhaust valve 15. This valve lift controller 9a can change the magnitude of rocking which is transferred from the cams 32, 34 to the rocker arms 31, 33. Any specific structure can be used for changing the magnitude of rocking of the rocker arms 31, 33.

For example, on the side of the intake valve 14, a structure may be used which converts the rotation movement of the camshaft to the rocking movement of the rocker arm 31 via a rocking member disposed between the cam 32 fixed to the camshaft and the rocker arm 31. In this case, by moving the position of the rocking member to change the contact position with the cam 32, the amount of rocking of the rocking member, and thus the amount of rocking of the rocker arm 31 are changed. This can continuously change the valve lift of the intake valve 14. Note that the same goes for the side of the exhaust valve 15. The lift of the exhaust valve 15 can be adjusted by the structure in which the rocking member is disposed between the cam 34 and the rocker arm 33.

Hereinafter, the angle variation from the reference position of the rocking member for the rocker shaft is referred to as a control angle $\theta_{VVL}$. The control angle $\theta_{VVL}$ is a parameter corresponding to the valve lift. The reference position of the rocking member is set such that the valve lift increases as the control angle $\theta_{VVL}$ increases. The valve lift controller 9a controls the valve lift to have any value through adjustment of this control angle $\theta_{VVL}$.

The valve timing controller 9b is a mechanism which changes the open/close timing (valve timing) of the intake valve 14 and the exhaust valve 15. This valve timing controller 9b can change the rotation phase of the cams 32, 34 or the camshaft which rocks the rocker arms 31, 33. The rocking timing of the rocker arms 31, 33 with respect to the rotation phase of the crankshaft 17 can be time lagged continuously by changing the rotation phase of the cams 32, 34 and camshaft.

Hereinafter, the variation of the phase angle indicating how much the actual phase angle of the camshaft advances or retards from the reference phase angle of the camshaft is referred to as a phase angle $\theta_{VVL}$. The phase angle $\theta_{VVL}$ is a parameter corresponding to the valve timing. The valve timing controller 9b adequately controls the valve timing by adjusting this phase angle $\theta_{VVL}$.

[1-3. Intake System]

The injector 18 which injects fuel is provided in the intake port 11. The amount of fuel injected by the injector 18 is electrically controlled by an engine controller 1 which is described later. An intake manifold 20 is provided at the upstream of the intake air flow from the injector 18. The intake manifold 20 is provided with a surge tank 21 which temporarily stores air flowing into the intake port 11. The intake manifold 20 downstream of the surge tank 21 branches to a plurality of cylinders 19. The surge tank 21 is located at that branch point. The surge tank 21 absorbs the intake air pulsation and the intake air interference which are generated in the cylinders 19.

The upstream end of the intake manifold 20 is connected to a throttle body 23. An electronically-controlled throttle valve 24 is installed in the throttle body 23. The air volume flowing to the intake manifold 20 is adjusted in response to the opening of the throttle valve 24 (throttle opening $\theta_{TH}$). This throttle opening $\theta_{TH}$ is electrically controlled by the engine controller 1.

The upstream side of the throttle body 23 is connected to an intake air path 25. Additionally, an air filter 28 is disposed upstream of the intake air path 25. Filtered air is thereby provided to the cylinder 19 of the engine 10 through the intake air path 25 and the intake manifold 20.

[1-4. Detection System]

The crankshaft 17 is provided with at one end, a disk 17a having a central axis corresponding to the rotation axis of the crankshaft 17 and a crank angle sensor 29 which detects the rotation angle $\theta_{CR}$ of the crankshaft 17. The variation of rotation angle $\theta_{CR}$ per unit time is proportional to the actual speed Ne of the engine 10. Thus, the crank angle sensor 29 can detect the actual speed Ne of the engine 10. The information of the actual speed Ne detected (or calculated) here is transmitted to the engine controller 1. Note that the actual speed Ne may be calculated in the engine controller 1 on the basis of the rotation angle $\theta_{CR}$ detected by the crank angle sensor 29. Hereinafter, the actual speed Ne of the engine 10 is also referred to as an engine speed Ne.

The crank disk 17a and crank angle sensor 29 may each ant shape and arrangement. A typical method for detecting the rotation angle $\theta_{CR}$ of the crankshaft 17 utilizes a lost tooth area formed in the crank disk 17a. For example, a plurality of tooth parts 17b are formed from the outer periphery toward the center of the crank disk 17a such that ends of these tooth parts 17b pass through the detection range of the crank angle sensor 29, as shown in FIG. 1.

These tooth parts 17b are spaced equally in the circumferential direction, some tooth parts 17b being removed in two areas to provide tooth missing parts. The intervals of these tooth missing parts are set about 180 degrees. Additionally, the crank angle sensor 29 works as a position sensor which outputs "ON" signals when detecting the ends of the tooth parts 17b, and stops output of "ON" signals (outputs "OFF" signals) when the sensor 29 detects the gaps or missing parts between the tooth parts 17b.

In the case of such a configuration, the crank angle sensor 29 outputs the "ON" signals periodically for every half rotation of the crankshaft 17. The "ON" signals which are output periodically are generally referred to as SGT signals, and can be used as a clock signal having a frequency corresponding to the speed of the crankshaft 17.

An air pressure sensor 27 and an intake manifold pressure sensor 22 are provided upstream and downstream, respectively, of the throttle valve 24 to detect pressures thereat. The air pressure sensor 27 detects the upstream pressure $P_B$ (air pressure) of the throttle valve 24, while the intake manifold pressure sensor 22 detects the downstream pressure $P_A$ (intake manifold pressure, pressure in the surge tank 21) of the throttle valve 24. The information of the downstream pressure $P_A$ and upstream pressure $P_B$ detected by these intake manifold pressure sensor 22 and air pressure sensor 27 is transmitted to the engine controller 1.

An accelerator pedal sensor 30 is provided at anywhere in the automotive vehicle, and detects an operation amount $\theta_{AC}$ corresponding to the pressing amount of an accelerator pedal. The operation amount $\theta_{AC}$ of the accelerator pedal is a parameter corresponding to the request of acceleration by a driver. In other words it corresponds to the output requirement to the engine 10. The information of the operation amount $\theta_{AC}$ is transmitted to the engine controller 1.

[1-5. Control System]

This automotive vehicle is provided with the electronic engine controller 1 (Engine-ECU, Engine Electronic Control Unit) is provided. The engine controller 1 is, for example, an LSI device (Large Scale Integration device) or an embedded electronic device which is integrated with a microprocessor, a ROM (Read Only Memory), a RAM (Random Access Memory) and any other device.

The engine controller 1 is connected to other electronic controllers, a movable valve mechanism 9, and various sensors via a communication line such as a CAN (Controller Area Network), a FlexRay (this is an automotive network communications protocol developed by the FlexRay Consortium) installed in the automotive vehicle.

Specific examples of other electronic controllers are a CVT-ECU35 which controls a CVT unit (Continuously Variable Transmission, gear box), a ECU36 which controls an air conditioner, a ECU37 which controls electric components (not shown).

This engine controller 1 controls various systems, such as an ignition system, a fuel system, an intake and an exhaust system, and a valve operation system (valve train), for the engine 10. The controller performs torque based control which uses the magnitude of torque required to the engine 10.

The engine controller 1 particularly controls the amount of fuel injected from an injector 18, the injection timing of the injector 18, the timing of ignition of an spark plug 13, the valve lift and valve timing of the intake valve 14 and the exhaust valve 15, the opening of the throttle valve 24, for example. This embodiment focuses on the estimation control in which the actual air volume after a couple of strokes (subsequent) is estimated on the basis of the target air volume and actual air volume of the engine 10. The function of this estimation control will be described below.

2. Control Configuration

The input port of the engine controller 1 is connected to the air flow sensor 26, the intake manifold pressure sensor 22, the air pressure sensor 27, the crank angle sensor 29, and the accelerator pedal sensor 30. The engine controller 1 calculates target torque, i.e., a target value of torque accomplished by adjusting the intake air volume, which torque is required to the engine 10, on the basis of the information from these sensors. The engine controller 1 controls the throttle opening $\theta_{TH}$ of the throttle valve 24 such that the air volume required for generating the target torque is inhaled into the cylinder 19. Also the engine controller 1 controls the injector 18 and the spark plug 13 on the basis of the subsequent estimated air volume.

The engine controller 1 includes a calculator 2, an estimation unit 3, and a controller 4 as shown in FIG. 1. Each function of the calculator 2, the estimation unit 3, and the controller 4 may be accomplished by an electronic circuit (hardware), or may be programmed in the form of software. Alternatively some of these functions may be provided in the form of hardware, and the others may be provided as software.

[2-1. Calculator]

The calculator 2 calculates various parameters used for the estimation control. The calculator 2 includes an actual air volume calculator 2a, a target air volume calculator 2b, a stroke time detector 2c, a calculation cycle detector 2d, and memory unit 2e.

The actual air volume calculator 2a calculates an actual charging efficiency Ec corresponding to the actual air volume inhaled into the cylinder 19 of the engine 10. The actual air volume calculator 2a calculates the actual charging efficiency Ec on the basis of an intake air flow volume Q detected by the air flow sensor 26. The actual charging efficiency Ec is obtained by normalizing the volume of air filling the cylinder 19 during one inlet stroke (for example, one stroke in which the piston 16 moves from the top dead center to the lower dead center), into the volume of gas at a normal state, and dividing it by the volumetric capacity of the cylinder. The actual charging efficiency Ec is a parameter corresponding to the air volume newly inhaled into the cylinder 19 during that stroke.

The actual air volume calculator 2a periodically calculates the actual charging efficiency Ec for every inlet stroke of each cylinder 19, at the end of inlet phase. For example, the actual air volume calculator 2a calculates the actual charging efficiency Ec for each half rotation of the crankshaft 17 so as to synchronize with the SGT signals transmitted from the crank angle sensor 29. The value of the actual charging efficiency Ec calculated by the actual air volume calculator 2a is transmitted to the estimation unit 3.

The target air volume calculator 2b calculates the charging efficiency as a target charging efficiency $Ec_{TGT}$ corresponding to the air volume required to the engine 10. The target air volume calculator 2b calculates the magnitude of target torque to be output by the engine 10, and the air volume required for generating that torque is, and the charging efficiency corresponding to that air volume as a target charging efficiency $Ec_{TGT}$. The target torque is set on the basis of the torque required by the driver which torque is set in response to the engine speed Ne and the pressing operation amount $\theta_{AC}$ of the accelerator pedal, and the torque required for the operation of the CVT-ECU35, the air conditioner ECU36, the electric component ECU37 and any other electrical components. Additionally, the air volume and target charging efficiency $Ec_{TGT}$ is calculated on the basis of the predetermined corresponding map of the target torque versus the target charging efficiency $Ec_{TGT}$, and a mathematical Equation, for example.

The target charging efficiency $Ec_{TGT}$ is calculated with the predetermined calculation cycle $T_{MAIN}$. That is, the target charging efficiency $Ec_{TGT}$ is calculated with at different intervals from the actual charging efficiency Ec which is calculated in accordance with the combustion cycle of the engine 10. Note that the frequency of the calculations of the target charging efficiency $Ec_{TGT}$ is preferably set to be higher than the actual charging efficiency Ec regardless of the operating condition of the engine 10. For example, the calculation cycle $T_{MAIN}$ of the target charging efficiency $Ec_{TGT}$ is preferably set to about from 10 ms to 12 ms ("ms" means "millisecond"). The value of the target charging efficiency $Ec_{TGT}$ calculated by the target air volume calculator 2b is transmitted to the memory unit 2e and the controller 4. Note that the controller 4 uses the target charging efficiency $Ec_{TGT}$ for control of the opening of the throttle valve 24 and control of the ignition of the spark plug 13, for example.

The stroke time detector 2c calculates the stroke time $T_{180}$ of the engine 10 on the basis of the SGT signals (crank angle signals) output from the crank angle sensor 29. This stroke time $T_{180}$ corresponds to the intervals of the "ON" SGT signals. The value of the stroke time $T_{180}$ calculated by the stroke time detector 2c is transmitted to the estimation unit 3.

The calculation cycle detector 2d detects the calculation cycle $T_{MAIN}$ of the target charging efficiency $Ec_{TGT}$ at the target air volume calculator 2b. Although this calculation cycle $T_{MAIN}$ is basically fixed which is set previously (for example, 10 ms) as described above, it might be extended slightly by the operating condition of the automotive vehicle and the calculating load of the engine controller 1. Thus, when the target charging efficiency $Ec_{TGT}$ is calculated by the target air volume calculator 2b, the calculation cycle detector 2d measures the elapsed time from the last calculation of the target charging efficiency $Ec_{TGT}$, and transmits that measured time to the memory unit 2e as a calculation cycle $T_{MAIN}$.

The memory unit 2e (memory) stores the history of the target charging efficiency $Ec_{TGT}$ calculated by the target air volume calculator 2b. The memory unit 2e stores the history of the previous predetermined times corresponding to the drive delay time of the throttle valve 24. The drive delay time involves from a time when the throttle valve 24 receives a control signal from the engine controller 1, to a time when the opening of the throttle valve 24 completes to change as it is instructed by the control signal. To be more precise, the drive delay time is a parameter corresponding to a period from a time when the target charging efficiency $Ec_{TGT}$ is calculated by the target air volume calculator 2b, as a reference, to a time when that target charging efficiency $Ec_{TGT}$ is reflected in the actual charging efficiency Ec calculated by the actual air volume calculator 2a via control of the opening of the throttle valve 24.

Figure 2A:
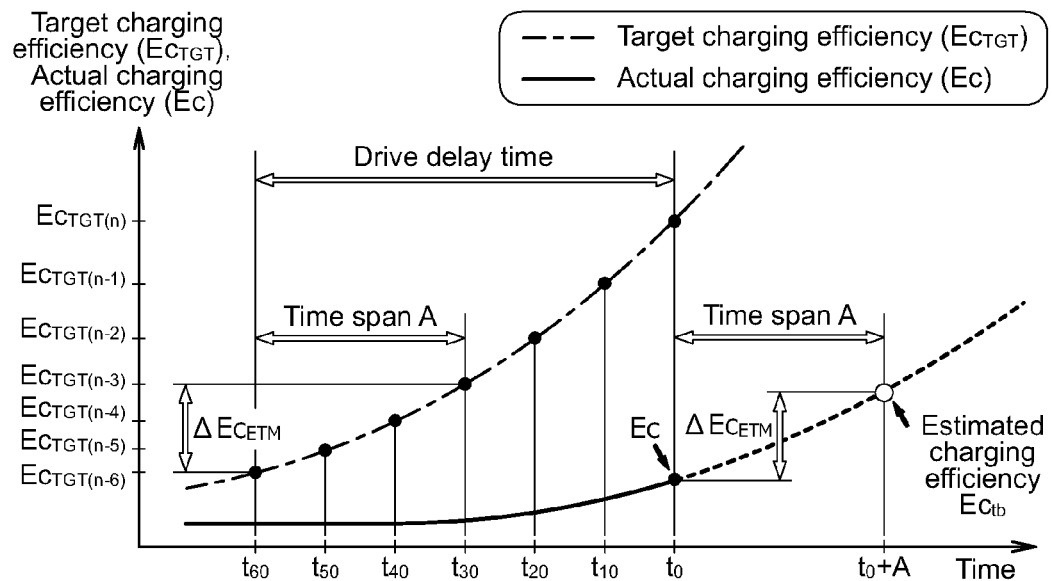
FIG. 2A is an illustrative graph of a calculation outline in the control apparatus, which graph conceptually shows variations in target charging efficiency and actual charging efficiency over time.

In this embodiment, assuming that the drive delay time of the throttle valve 24 is about 60 ms, the memory unit 2e stores the history of the target charging efficiencies $Ec_{TGT}$ for 60 ms. For example, on the basis of the present time $T_0$, the memory unit 2e stores six target charging efficiencies $Ec_{TGT(n-1)}$ to $Ec_{TGT(n-6)}$ where $Ec_{TGT(n-1)}$ is the latest target charging efficiency calculated at the latest time $t_{10}$, and where $Ec_{TGT(n-2)}$ is the second latest target charging efficiency calculated at the second latest time $t_{20}$, and $Ec_{TGT(n-6)}$ is the sixth latest charging efficiency calculated at the sixth latest time $T_{60}$, as shown in FIG. 2A. In addition, when new target charging efficiency $Ec_{TGT}$ is calculated at the next calculation cycle, the oldest data is deleted, thus the memory unit 2e always stores the latest six data.

Figure 2B:
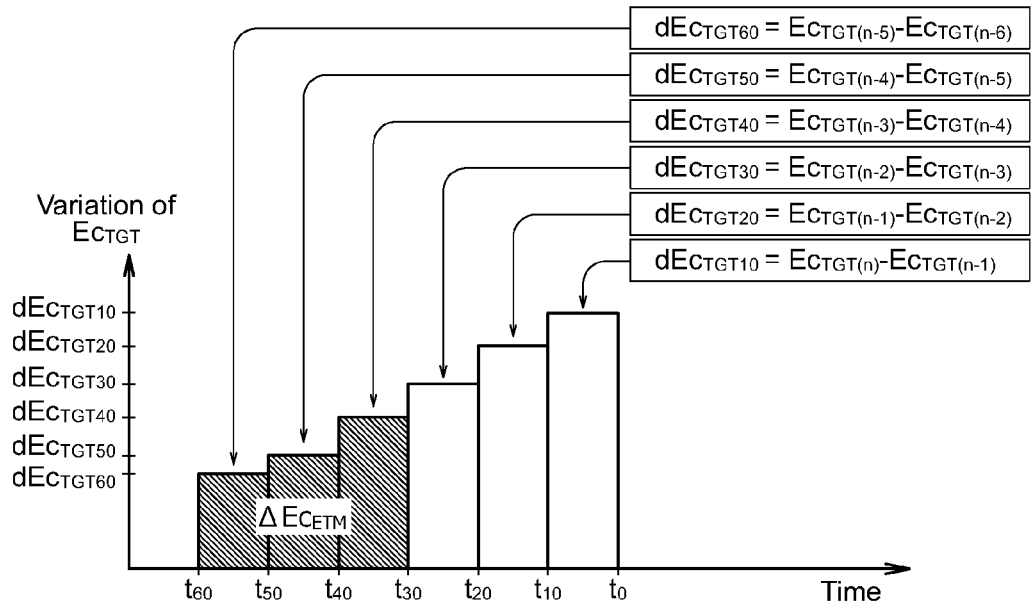
FIG. 2B is an illustrative graph of a calculation outline in the control apparatus, which graph shows an increment/decrement of the target charging efficiency per calculation cycle.

Alternatively, whenever a new target charging efficiency $Ec_{TGT(n)}$ is input from the target air volume calculator 2b, a difference $dEc_{TGT10}$ between the new target charging efficiency $Ec_{TGT(n)}$ and the latest target charging efficiency $Ec_{TGT(n-1)}$ may be calculated and stored in the memory unit 2e as shown in FIG. 2B. In this case, the value $dEc_{TGT10}$ calculated at the latest calculation cycle is assigned to the value $dEc_{TGT20}$ at the second latest cycle, and the calculated value $dEc_{TGT20}$ calculated at the second calculation cycle is assigned to the value $dEc_{TGT30}$ at the third latest cycle. In this manner, the information $dEc_{TGT10}$–$dEc_{TGT60}$ on the differences in the target charging efficiencies $Ec_{TGT}$ of 60 ms is stored with being updated at all times.

In addition, the history information stored in the memory unit 2e may be corrected using the calculation cycle $T_{MAIN}$ detected by the calculation cycle detector 2d. In other words, when a new target charging efficiency $Ec_{TGT}$ is input from the target air volume calculator 2b, $dEc_{TGT10}$ is calculated from the Equation 1. The max function in Equation 1 selects the larger one of the calculation cycle $T_{MAIN}$ MS or 10 ms. The value $dEc_{TGT10}$ is obtained by multiplying the difference $\{Ec_{TGT(n)}-Ec_{TGT(n-1)}\}$ the predetermined period (10 ms, for example), then by dividing by the larger one of the calculation cycle $T_{MAIN}$ or the predetermined period.

With such a calculation, the variation of the target charging efficiency $Ec_{TGT}$ is converted into the variation for 10 ms (change rate in other words) to be stored in the memory unit 2e, even though the calculation cycle $T_{MAIN}$ of the target charging efficiency $Ec_{TGT}$ exceeds 10 ms.

$$dEc_{TGT10}=\{Ec_{TGT(n)}-Ec_{TGT(n-1)}\}\times 10[\text{ms}]/\max\{T_{MAIN},10\}[\text{ms}] \quad \text{(Equation 1)}$$

[2-2. Estimation Unit]

The estimation unit 3 (estimator) performs various calculations relating to the subsequent actual air volume using various parameters calculated by the calculator 2. The estimation unit 3 includes an estimation span calculator 3a, a variation calculator 3b, and an estimated air volume calculator 3c.

The estimation span calculator 3a calculates a time span A from the present time to a time desired to be estimated. The time taken by the each stroke in the combustion cycle of the engine 10 varies in response to the engine speed Ne. Thus, the estimation span calculator 3a calculates the time span A from the stroke time $T_{180}$ detected by the stroke time detector 2c or the engine speed Ne. The value of the time span A calculated by the estimation span calculator 3a is transmitted to the variation calculator 3b.

For example, for the control of the fuel injection rate of the injector 18, the time span A is calculated from the present time to the subsequent time to be calculated after two strokes. The time taken by two strokes is equal to the time required by one turn of the crankshaft 17, and is obtained from the following Equation.

$$A[\text{ms}]=2\times T_{180}[\text{ms}](60000[\text{rpm}\cdot\text{ms}]/Ne[\text{rpm}]) \quad \text{(Equation 2)}$$

Note that the coefficient before the stroke time $T_{180}$ corresponds to the number of strokes repeated until the time desired to be estimated. In other words, if the number of strokes until the time desired to be estimated is not two (For example, the timing of the fuel injection is 2.5 stroke before or 1.5 stroke before from the calculation of the actual charging efficiency Ec), the coefficient in Equation 2 can be changed in response to the stoke number as 2.5 or 1.5.

The variation calculator 3b calculates the variation $\Delta Ec_{ETM}$ of the target charging efficiency $Ec_{TGT}$ from a time 60 ms before to a time when the time span A has passed, which variation $\Delta Ec_{ETM}$ corresponds to the drive delay time of the throttle valve 24, on the basis of the target charging efficiency $Ec_{TGT}$ stored in the memory unit 2e. For example, if the time span A calculated by the estimation span calculator 3a is 40 ms, The variation calculator 3b calculates the variation $\Delta Ec_{ETM}$ of the target charging efficiency $Ec_{TGT}$ from the time 60 ms before to a time when 40 ms has passed (20 ms before). The value of the variation $\Delta Ec_{ETM}$ calculated by the variation calculator 3b is transmitted to the estimated air volume calculator 3c.

As shown in FIG. 2A, if the target charging efficiencies $Ec_{TGT(n-1)}$–$Ec_{TGT(n-6)}$ of six calculation cycles are stored, the variation $\Delta Ec_{ETM}$ can be calculated using the relation described in Table 1, for example.

TABLE 1

| Condition of time span A | $\Delta Ec_{ETM}$ |
|---|---|
| 120 [ms] ≤ A | $\Delta Ec_{ETM} = \{Ec_{TGT(n)} - Ec_{TGT(n-6)}\} \times 2$ |
| 60 [ms] ≤ A < 120 [ms] | $\Delta Ec_{ETM} = \{Ec_{TGT(n)} - Ec_{TGT(n-6)}\} \times A/60$ [ms] |
| 50 [ms] ≤ A < 60 [ms] | $\Delta Ec_{ETM} = \{Ec_{TGT(n-1)} - Ec_{TGT(n-6)}\} \times A/50$ [ms] |
| 40 [ms] ≤ A < 50 [ms] | $\Delta Ec_{ETM} = \{Ec_{TGT(n-2)} - Ec_{TGT(n-6)}\} \times A/40$ [ms] |
| 30 [ms] ≤ A < 40 [ms] | $\Delta Ec_{ETM} = \{Ec_{TGT(n-3)} - Ec_{TGT(n-6)}\} \times A/30$ [ms] |
| 20 [ms] ≤ A < 30 [ms] | $\Delta Ec_{ETM} = \{Ec_{TGT(n-4)} - Ec_{TGT(n-6)}\} \times A/20$ [ms] |
| 10 [ms] ≤ A < 20 [ms] | $\Delta Ec_{ETM} = \{Ec_{TGT(n-5)} - Ec_{TGT(n-6)}\} \times A/10$ [ms] |
| A < 10 [ms] | $\Delta Ec_{ETM} = 0$ |

As shown in FIG. 2B, if the differences $dEc_{TGT10}$-$dEc_{TGT60}$ of the target charging efficiency $Ec_{TGT}$ of six calculation cycles are stored, the variation $\Delta Ec_{ETM}$ can be calculated using the relation described in Table 2.

TABLE 2

| Condition of time span A | $\Delta Ec_{ETM}$ |
|---|---|
| 120 [ms] ≤ A | $\Delta Ec_{ETM} = (dEc_{TGT60} + dEc_{TGT50} + dEc_{TGT40} + dEc_{TGT30} + dEc_{TGT20} + dEc_{TGT10}) \times 2$ |
| 60 [ms] ≤ A < 120 [ms] | $\Delta Ec_{ETM} = (dEc_{TGT60} + dEc_{TGT50} + dEc_{TGT40} + dEc_{TGT30} + dEc_{TGT20} + dEc_{TGT10}) \times A/60$ [ms] |
| 50 [ms] ≤ A < 60 [ms] | $\Delta Ec_{ETM} = (dEc_{TGT60} + dEc_{TGT50} + dEc_{TGT40} + dEc_{TGT30} + dEc_{TGT20}) \times A/50$ [ms] |
| 40 [ms] ≤ A < 50 [ms] | $\Delta Ec_{ETM} = (dEc_{TGT60} + dEc_{TGT50} + dEc_{TGT40} + dEc_{TGT30}) \times A/40$ [ms] |
| 30 [ms] ≤ A < 40 [ms] | $\Delta Ec_{ETM} = (dEc_{TGT60} + dEc_{TGT50} + dEc_{TGT40}) \times A/30$ [ms] |
| 20 [ms] ≤ A < 30 [ms] | $\Delta Ec_{ETM} = (dEc_{TGT60} + dEc_{TGT50}) \times A/20$ [ms] |
| 10 [ms] ≤ A < 20 [ms] | $\Delta Ec_{ETM} = (dEc_{TGT60}) \times A/10$ [ms] |
| A < 10 [ms] | $\Delta Ec_{ETM} = 0$ |

The estimated air volume calculator 3c calculates the estimated value of the actual charging efficiency Ec as an estimated charging efficiency $Ec_{tb}$ on the basis of the actual charging efficiency Ec calculated by the actual air volume calculator 2a and the variation $\Delta Ec_{ETM}$ calculated by the variation calculator 3b. If the actual charging efficiency Ec is smaller than the predetermined maximum value $Ec_{MAX}$, the estimated air volume calculator 3c calculates the estimated charging efficiency $Ec_{tb}$ in accordance with Equation 3.

$$Ec_{tb} = Ec + \Delta Ec_{ETM} \quad \text{(Equation 3)}$$

If the actual charging efficiency Ec is equal to or larger the maximum value $Ec_{MAX}$, the estimated charging efficiency $Ec_{tb}$ becomes excessively large by adding $\Delta Ec_{ETM}$ to the actual charging efficiency Ec in some cases; hence, the estimated air volume calculator 3c calculates by directly assigning the actual charging efficiency Ec into the estimated charging efficiency $Ec_{tb}$ (=Ec). The value of the estimated charging efficiency $Ec_{tb}$ calculated by the estimated air volume calculator 3c is transmitted to the controller 4.

[2-3. Controller]

The controller 4 generates control signals transmitted to the controlled components such as the throttle valve 24, the injector 18. The controller 4 includes an intake controller 4a, a fuel controller 4b, and an ignition controller 4c.

The intake controller 4a (air inhalation controller) controls the intake air volume on the basis of the target charging efficiency $Ec_{TGT}$ calculated by the target air volume calculator 2b. The intake controller 4a controls the throttle opening $\theta_{TH}$ of the throttle valve 24 such that the charging efficiency corresponding to the actual air volume inhaled into the cylinder 19 becomes the target charging efficiency $Ec_{TGT}$. The intake air volume flowing through the throttle valve 24 depends on the throttle opening $\theta_{TH}$ and a flow rate of intake air. Additionally, the flow rate of intake air is calculated from the upstream pressure $P_B$ and downstream pressure $P_A$ of the throttle valve 24, engine speed Ne and any other parameters. The intake controller 4a thus controls the throttle opening $\theta_{TH}$ in response to a target flow rate, a flow rate of intake air, and a delay of intake air response (delay of intake air due to volumetric capacity of an intake pipe) which is obtained from the target charging efficiency $Ec_{TGT}$.

The intake controller 4a controls the throttle opening $\theta_{TH}$ of the throttle valve 24, for example, taking in to account the operating condition of the engine 10, the control angle $\theta_{VVL}$, the phase angle $\theta_{VVT}$ of the movable valve mechanism 9 and any other parameters. The throttle valve 24 is controlled such that the drive delay time is substantially constant even though these parameters vary. The above described drive delay time which is about 60 ms and the condition of the calculation by the estimation unit 3, involves a period from a time when the control signal is output from the intake controller 4a to a time when the opening of the throttle valve 24 actually changes to the throttle opening $\theta_{TH}$.

The fuel controller 4b controls the fuel injection rate for each cylinder 19 on the basis of the estimated charging efficiency $Ec_{tb}$ calculated by the estimated air volume calculator 3c. The fuel controller 4b sets the pulse width of the excitation signal such that the amount of fuel injected from the injector 18 corresponds to the estimated charging efficiency $Ec_{tb}$, and outputs the excitation signal to the injector 18. The pulse width of the excitation signal can be calculated on the basis of, for example, the desired air-to-fuel ratio and the estimated charging efficiency $Ec_{tb}$.

This excitation signal is output to the injector 18 of the cylinder 19 of which the inlet stroke will be finished after two strokes. Additionally, the time when the excitation signal is output to the injector 18 is two strokes before from the calculation of the actual charging efficiency Ec of the cylinder 19 of that injector 18. In this manner, the fuel injection rate is controlled, taking into account the estimated value of the air volume which will be inhaled into the cylinder 19 after two strokes.

The ignition controller 4c (ignition controller) controls the timing of ignition for each cylinder on the basis of the actual charging efficiency Ec calculated by the actual air volume calculator 2a and the estimated charging efficiency $Ec_{tb}$ calculated by the estimated air volume calculator 3c. The ignition controller 4c sets, in response to the engine speed Ne, a retard amount which corresponds to, for example, the best ignition timing (MBT, Minimum spark advance for Best Torque) for generating maximum torque with the actual charging efficiency Ec or the estimated charging efficiency $Ec_{tb}$. The control signal is output to the spark plug 13 at a timing of that retard amount.

The timing of the ignition is after the inlet stroke of that cylinder 19 is finished. In other words, the actual charging efficiency Ec is calculated from a time when the ignition control is performed, although the estimated charging efficiency $Ec_{tb}$ is not always required, the estimated charging efficiency $Ec_{tb}$ can be used which is calculated before the actual charging efficiency Ec is calculated.

3. Operation

Figure 3A:
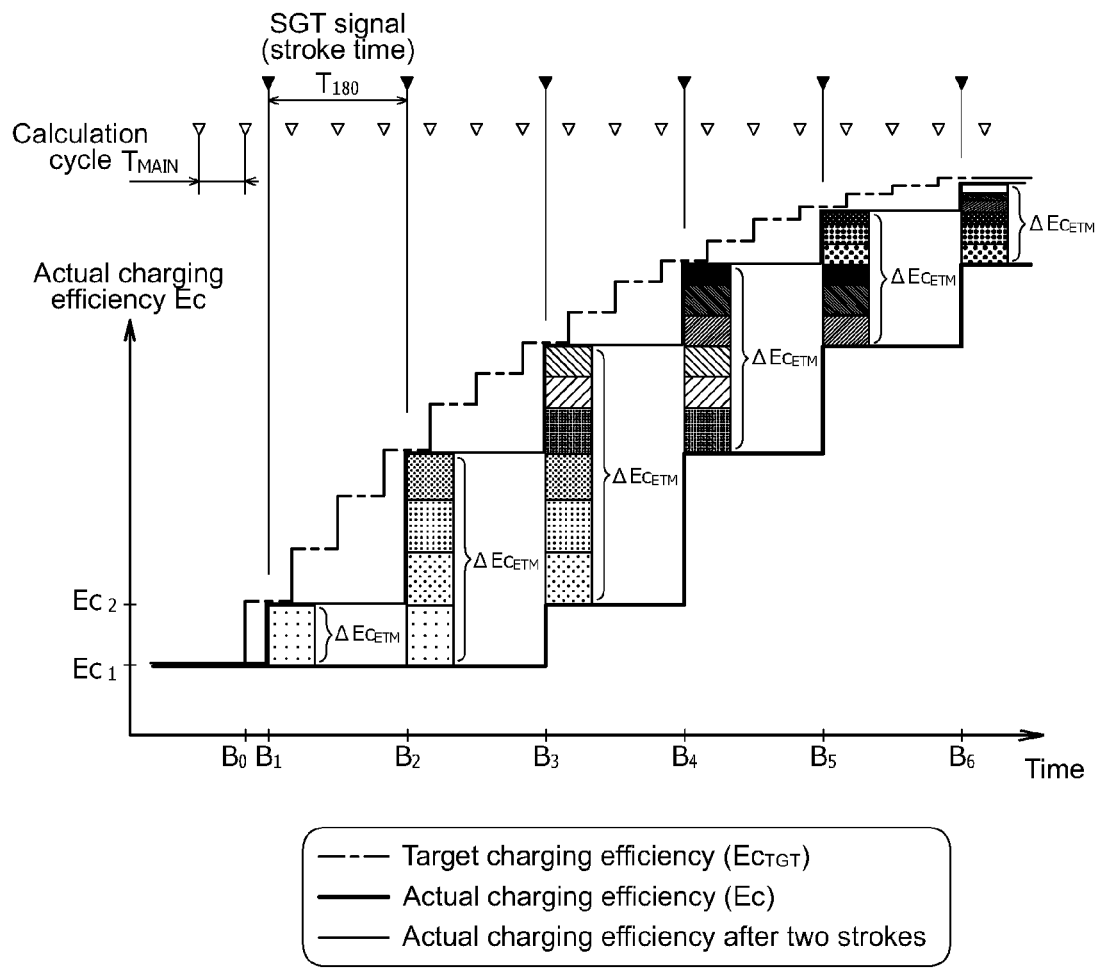
FIG. 3A is an illustrative graph of the estimation control performed in the control apparatus, which graph shows variations in target charging efficiency, actual charging efficiency, and estimated charging efficiency over time.

The operation of the control apparatus will be described. In FIG. 3A, the thick solid line represents the variation of the actual charging efficiency Ec calculated by the actual air volume calculator $2a$, the dashed line represents a variation in the target charging efficiency $Ec_{TGT}$ calculated by the target air volume calculator $2b$, and the thin solid line represents the actual charging efficiency after two strokes. The horizontal axis of the graph corresponds to time, and the vertical lines drawn for every half rotation (180 degrees) of the crankshaft 17 show the boundaries between the strokes. The vertical axis of the graph corresponds to the charging efficiency (actual charging efficiency, target charging efficiency, estimated charging efficiency).

The actual charging efficiency Ec is calculated every stroke time $T_{180}$, while the target charging efficiency $Ec_{TGT}$ is calculated every calculation cycle $T_{MAIN}$. Both these values are always updated. As shown in FIG. 3A, at an engine speed Ne of 1000 rpm, the stroke time $T_{180}$ is 30 ms; thus, at a calculation cycle $T_{MAIN}$ of 10 ms, the target charging efficiency $Ec_{TGT}$ is updated three times for one stroke. After the target charging efficiency $Ec_{TGT}$ is updated, the history is stored in the memory unit $2e$ of the engine controller 1.

Before the time $t_0$, the engine 10 is operated normally and the actual charging efficiency Ec has a predetermined value $Ec_1$. For example, if the request for acceleration is input at time $t_0$, the target air volume calculator $2b$ calculates the target charging efficiency $Ec_{TGT(n)}$ in response to the request of acceleration, and transmits it to the memory unit $2e$ and the controller 4.

Figure 3B:
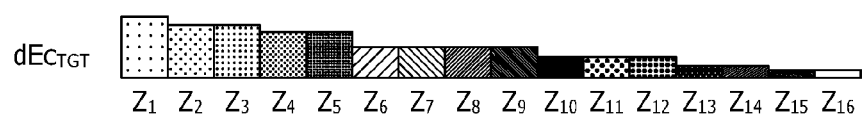
FIG. 3B is an illustrative graph of the estimation control performed in the control apparatus, which graph shows an increment/decrement of the target charging efficiency per calculation cycle.
Figure 4A:
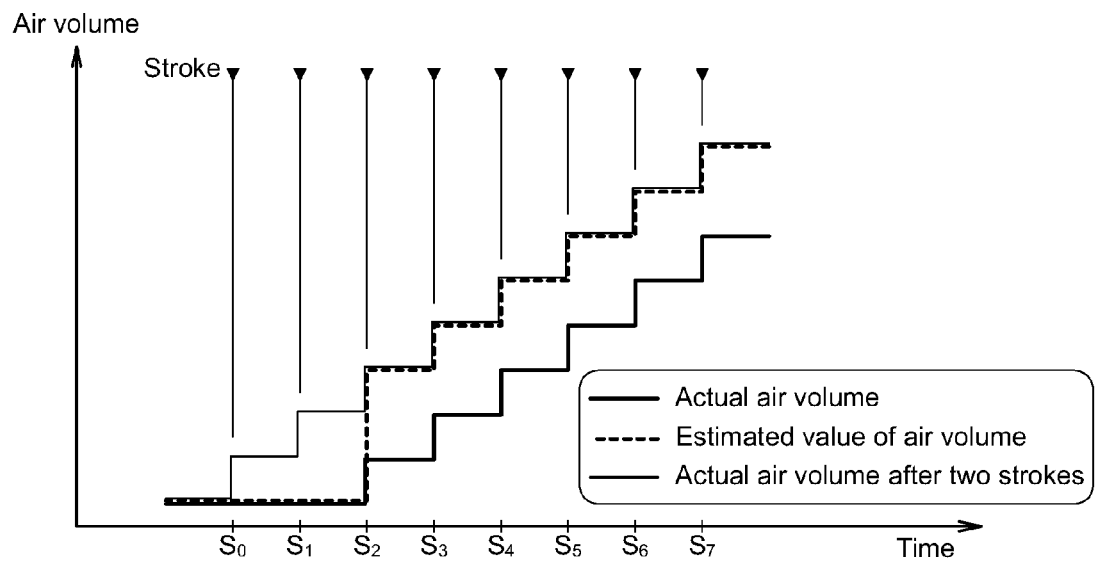
FIGS. 4A and 4B are both illustrative graphs of the estimation control performed in a conventional control apparatus.
Figure 4B:
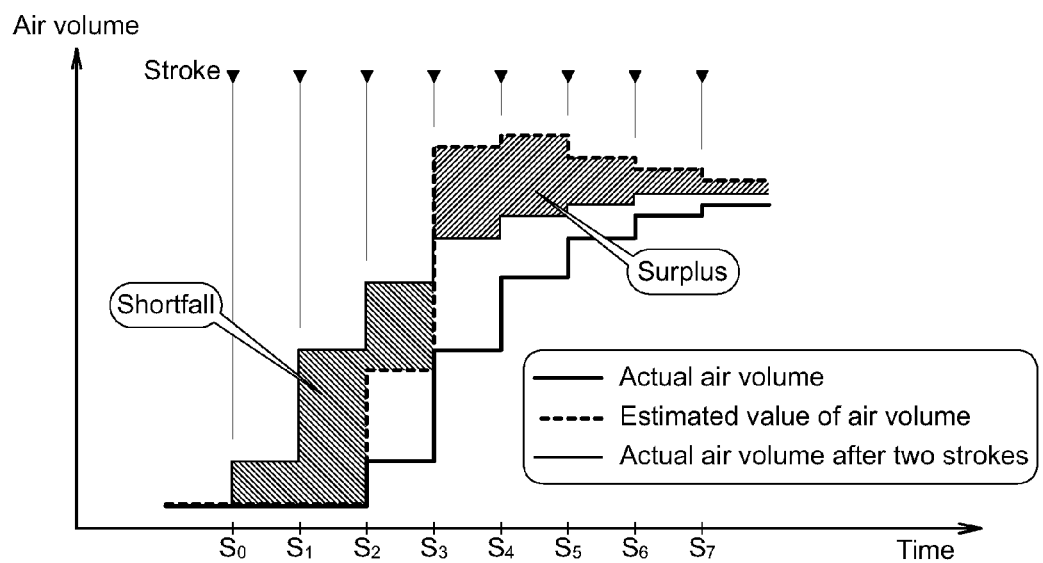

Whenever the latest target charging efficiency $Ec_{TGT(n)}$ is input to the memory unit $2e$, the difference $dEc_{TGT}$ between the latest one and the second latest one is calculated and stored therein in sequence. As shown in FIG. 3B, the value of the difference $dEc_{TGT}$ varies after time $B_0$ at which the target charging efficiency $Ec_{TGT}$ starts to increase. The magnitudes of the differences $dEc_{TGT}$ stored in the memory unit $2e$ after time $B_0$ are represented by $Z_1$-$Z_{16}$, in sequence from old one, and which will be described below.

At time $B_1$, just after time $B_0$, the variation of the actual charging efficiency Ec does not catch up with the variation of the target charging efficiency $Ec_{TGT}$, and the actual charging efficiency Ec starts to increase after time $B_3$ which is two strokes later. While at time $B_1$, the value of the charging efficiency corresponding to the estimated air volume inhaled at time $B_3$ is calculated. The fuel injection rate and the timing of ignition for that cylinder 19 are controlled on the basis of that value.

The estimated charging efficiency $Ec_{tb}$ at time $B_3$ is estimated at time $B_1$, and the time span A calculated by the estimation span calculator $3a$ is 60 ms. Thus, the variation calculator $3b$ adds six differences $dEc_{TGT}$ of the target charging efficiencies $Ec_{TGT}$ to the actual charging efficiency Ec to obtain the variation $\Delta Ec_{ETM}$. Since the value of the difference $dEc_{TGT}$ is zero before time $B_0$, the variation $\Delta Ec_{ETM}$ calculated by the variation calculator $3b$ at time $B_1$ is $Z_1$. Thus, the value of the estimated charging efficiency $Ec_{tb}$ calculated by the estimated air volume calculator $3c$ at time $B_1$ is a predetermined value, $Ec_1+Z_1$.

The target charging efficiency $Ec_{TGT}$ is transmitted to the intake controller $4a$, and the opening of the throttle valve 24 is controlled on the basis of that value. Additionally, the estimated charging efficiency $Ec_{tb}$ is transmitted to the fuel controller $4b$, and the amount of fuel injected from the injector 18 is controlled on the basis of that value. Note that the cylinder 19 into which fuel is injected at this stage is the cylinder 19 of which the inlet stroke will be finished after two strokes, at time $B_3$ or around.

At time $B_2$, one stroke (30 ms) later from time $B_1$, the actual charging efficiency Ec at time $B_4$, two strokes later from time $B_2$ is estimated. The differences $dEc_{TGT}$ of the target charging efficiencies $Ec_{TGT}$ from time $B_1$ to time $B_2$ are calculated four times by the variation calculator $3b$, and these values $Z_1$-$Z_4$ are stored in the memory unit $2e$. Thus, the variation $\Delta Ec_{ETM}$ calculated at time $B_2$ by the variation calculator $3b$ is the sum of values $Z_1$-$Z_4$. Additionally, although the actual charging efficiency Ec does not vary yet at time $B_2$, the estimated charging efficiency $Ec_{tb}$ calculated by the estimated air volume calculator $3c$ is obtained by adding the sum of values $Z_1$-$Z_4$ to the predetermined value $Ec_1$.

At time $B_3$, one stroke later from time $B_2$, the actual charging efficiency Ec at time $B_5$ is estimated. At that time, the six values $Z_2$-$Z_7$ of the differences $dEc_{TGT}$ of the target charging efficiencies $Ec_{TGT}$ are stored in the memory unit $2e$. Thus, the variation $\Delta Ec_{ETM}$ calculated at time $B_3$ by the variation calculator $3b$ is the sum of values $Z_2$-$Z_7$.

At time $B_3$, the variation of the actual charging efficiency Ec catches up with the variation of the target charging efficiency $Ec_{TGT}$ at time $B_1$, the value of the actual charging efficiency Ec at time $B_3$ is the predetermined time $Ec_2$. Thus, the value of the estimated charging efficiency $Ec_{tb}$ calculated by the estimated air volume calculator $3c$ is the value obtained by adding the sum of values $Z_2$-$Z_7$ to the predetermined value $Ec_2$.

After time $B_3$, the actual charging efficiency Ec and the estimated charging efficiency $Ec_{tb}$ are calculated for every stroke, the intake air volume and the fuel injection rate are controlled on the basis of these values. The value of the estimated charging efficiency $Ec_{tb}$ becomes equivalent to the actual charging efficiency Ec after two strokes, using the drive delay time of the throttle valve 24 which is controlled on the basis of the target charging efficiency $Ec_{TGT}$, by adding the variation $\Delta Ec_{ETM}$ of the target charging efficiency $Ec_{TGT}$ to the actual charging efficiency Ec at that time.

As shown in FIG. 3A, the variation of the values of the estimated charging efficiencies $Ec_{tb}$ calculated at individual times $B_1, B_2, \ldots B_6$, substantially corresponds to the variation of the actual charging efficiencies Ec after two strokes, which is shown by the thin solid line. In other words, the actual charging efficiency Ec after 60 ms can be accurately estimated.

4. Advantageous Effect

As described above, the engine controller 1 according to the present embodiment does not use a predictive method based only the actual charging efficiency Ec, but uses the predictive method based on a combination of the actual charging efficiency Ec and the target charging efficiency $Ec_{TGT}$. Thereby, the estimated charging efficiency $Ec_{tb}$ can be calculated taking into account the effect of the time lag of the actual charging efficiency Ec with respect to the target charging efficiency $Ec_{TGT}$. For example, since the fuel injection rate and the timing of ignition corresponding to air to be inhaled into the cylinder 19 is calculated before the inlet stroke of that cylinder 19 is finished, the estimated charging efficiency $Ec_{tb}$ can accurately calculated, resulting in the improvement of the controllability of the engine 10.

For example, since the fuel controller $4b$ of the engine controller 1 controls the fuel injection rate on the basis of the estimated charging efficiency $Ec_{tb}$ estimated by the estimated air volume calculator 3c, it is possible to calculate and control the fuel injection rate before the end of the inlet stroke, resulting in accurate control of the air-to-fuel ratio. In particular, the variation in the air-to-fuel ratio during the transient time (while the time slope of the actual charging efficiency Ec is varying) can be reduced, a resulting in the accurate control of the engine torque.

Additionally, the same goes for the ignition control of the engine 10. Since the ignition controller 4c controls the timing of ignition on the basis of the estimated charging efficiency $Ec_{tb}$, the target value of the retard amount can be calculated before the end of the inlet stroke. Thus, the controllability of the engine 10 can be further improved. Note that since the ignition control is performed after the end of the inlet stroke, the retard amount can be calculated using the estimated charging efficiency $Ec_{tb}$ and the actual charging efficiency Ec in combination. The controllability of the engine 10 can be further improved using such a calculating method.

The engine controller 1 calculates the estimated charging efficiency $Ec_{tb}$ using the history of the target charging efficiency $Ec_{TGT}$, as described above. Thereby, the subsequent variation of the actual charging efficiency Ec can be estimated taking into account the history of the target charging efficiency $Ec_{TGT}$. This results in improvements in the accuracy of the estimated charging efficiency $Ec_{tb}$, and thus the controllability of the engine 10.

The memory unit 2e of the engine controller 1 stores the history of the target charging efficiency $Ec_{TGT}$ for a predetermined period of time (for example, for past 60 ms) corresponding to the drive delay time of the throttle valve 24. Thereby, the variation of the actual charging efficiency Ec at least to a time when the predetermined period of time has passed can be accurately grasped, resulting in an improvement of the controllability of the engine 10. In addition, it is possible to estimate the estimated charging efficiency $Ec_{tb}$ at a time after the predetermined period of time by, for example, extrapolating the variation trend of the estimated charging efficiency $Ec_{tb}$ to the time when the predetermined time has passed.

The controller 1 calculates the variation $\Delta Ec_{ETM}$ of the target charging efficiency $Ec_{TGT}$ with a time span to a time desired to be estimated, and calculates the subsequent estimated charging efficiency $Ec_{tb}$ using this variation $\Delta Ec_{ETM}$ and the actual charging efficiency Ec. Thereby, the variation of actual charging efficiency Ec can be accurately estimated, even though the value of the target charging efficiency $Ec_{TGT}$ does not correspond to the value of the subsequent actual charging efficiency Ec after the drive delay time.

As described in Equation 1, in the case of a configuration which corrects the difference $dEc_{TGT}$ of the target charging efficiency $Ec_{TGT}$ using the calculation cycle $T_{MAIN}$ detected by the calculation cycle detector 2d, the value of the corrected difference $dEc_{TGT}$ is converted to a change rate within 10 ms, even though the calculation cycle $T_{MAIN}$ of the target charging efficiency $Ec_{TGT}$ is extended more than 10 ms previously set. Thus, the calculating accuracy of the variation $\Delta Ec_{ETM}$ for estimating the actual charging efficiency Ec can be maintained regardless of the variation of calculation cycle $T_{MAIN}$, resulting in the accurate calculation of the value of the estimated charging efficiency $Ec_{tb}$.

5. Alternative

The engine controller 1 which controls the engine 10 having the four cylinders is illustrated in the above described embodiment. However, the engine controller 1 can control any other engine having different numbers of strokes and cylinders. The controller can also control an engine 10 without the movable valve mechanism 9 or the CVT-ECU 35.

In the above described engine controller 1, an estimating calculation method is illustrated which uses the target charging efficiency $Ec_{TGT}$ and the actual charging efficiency Ec as parameters. A system which at least calculates a parameter corresponding to the target air volume, and a parameter corresponding to the actual air volume, can also calculate the estimated charging efficiency $Ec_{tb}$ using the engine controller 1. For example, a similar estimating calculation may be performed using an intake air flow volume flowing through the intake air path 25 and a volumetric efficiency instead of the charging efficiency.

Additionally, in the embodiment described above, the subsequent estimated value of the actual charging efficiency Ec is calculated by applying a variation in the past target charging efficiency $Ec_{TGT}$ to a variation in the subsequent actual charging efficiency Ec. The correspondence between these variations, however, is not always fixed. Thus, the estimated charging efficiency $Ec_{tb}$ can be calculated more accurately by correcting the variation $\Delta Ec_{ETM}$ in response to the operating condition of the engine 10 and ambient conditions.

In the case that the performance of the driven response of the throttle valve 24 varies in response to the driving condition of the automotive vehicle, and that the time lag of the driven response, the quantity of data in the history of the target charging efficiency $Ec_{TGT}$ to be stored in the memory unit 2e can be changed on the basis of the driving conditions of the automotive vehicle.

For example, if the time lag of the driven response is about 70 ms, the history of the target charging efficiency $Ec_{TGT}$ for 70 ms is stored in the memory unit 2e. In this case, the amount of the target charging efficiency $Ec_{TGT}$ which has varied during the time from a time before 70 ms to a time when the time span A has passed can be set as the variation $\Delta Ec_{ETM}$. The estimated charging efficiency $Ec_{tb}$ can be calculated by adding "the amount of the target charging efficiency $Ec_{TGT}$ (variation $\Delta Ec_{ETM}$) which varies during the time from a time before the time lag of the driven response to the time when the time span A has passed" to "the actual charging efficiency Ec at the present time" as in the case of the embodiment described above.

REFERENCE SIGNS LIST 1 engine control apparatus
2 calculator
2a actual air volume calculator
2b target air volume calculator
2c stroke time detector
2d calculation cycle detector
2e memory unit
3 estimation unit (estimator)
3a estimation span calculator
3b variation calculator
3c estimated air volume calculator
4 controller
4a intake controller (air inhalation controller)
4b fuel controller
4c ignition controller
10 engine
Ec actual charging efficiency
$Ec_{TGT}$ target charging efficiency
$Ec_{tb}$ estimated charging efficiency
$\Delta Ec_{ETM}$ variation The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine control apparatus, including a processor for executing a program, comprising:
    a target air volume calculator, executed by the processor, which calculates a target air volume required by an engine;
    an actual air volume calculator, executed by the processor, which calculates an actual air volume inhaled into a cylinder of the engine;
    an estimator, executed by the processor, which calculates an estimated value of the subsequent actual air volume as an estimated air volume on the basis of a time lag from a time when the target air volume is calculated to a time when the actual air volume reaches the target air volume; and
    a controller, executed by the processor, that controls at least one of a throttle valve of the engine to control an intake air amount, a spark plug to control a timing of ignition of the engine, and a fuel injector to control a fuel injection rate based on the calculated estimated air volume,
    wherein the estimator calculates the estimated value of the subsequent actual air volume by applying a variation in the past target air volume to a variation in the subsequent actual air volume.

2. The engine control apparatus according to claim 1 further comprising:
    a memory which stores a history of the target air volume,
    wherein the estimator calculates the estimated air volume on the basis of the history of the target air volume and the actual air volume.

3. The engine control apparatus according to claim 2, wherein the controller includes,
    an air inhalation controller which controls the throttle valve of the engine on the basis of the target air volume,
    wherein the memory stores the history of a period of time corresponding to at least a drive delay time of the throttle valve as the history of the target air volume.

4. The engine control apparatus according to claim 2, wherein the estimator includes:
    an estimation span calculator, executed by the processor, which calculates a time span between a time when the estimated value is calculated and a subsequent time when the actual air volume is estimated to reach the estimated value;
    an variation calculator, executed by the processor, which calculates an variation of the target air volume from a time earlier than the time when the estimated value is calculated to a time when the time span has passed, among the history stored in the memory; and
    an estimated air volume calculator, executed by the processor, which calculates the estimated air volume on the basis of the actual air volume and the variation.

5. The engine control apparatus according to claim 2 further comprising:
    a calculation cycle detector, executed by the processor, which detects a calculation cycle of the target air volume for the target air volume calculator,
    wherein the memory stores, as the history, a value of a change rate of the target air volume corresponding to a fixed cycle converted using the calculation cycle.

6. The engine control apparatus according to claim 1, wherein the controller includes,
    a fuel controller which controls the fuel injection rate of the engine on the basis of the estimated air volume.

7. The engine control apparatus according to claim 1, wherein the controller includes,
    an ignition controller which controls the timing of ignition of the engine on the basis of the estimated air volume.

8. The engine control apparatus according to claim 3, wherein the estimator includes:
    an estimation span calculator, executed by the processor, which calculates a time span between a time when the estimated value is calculated and a subsequent time when the actual air volume is estimated to reach the estimated value;
    an variation calculator, executed by the processor, which calculates an variation of the target air volume from a time earlier than the time when the estimated value is calculated to a time when the time span has passed, among the history stored in the memory; and
    an estimated air volume calculator, executed by the processor, which calculates the estimated air volume on the basis of the actual air volume and the variation.

9. The engine control apparatus according to claim 3 further comprising:
    a calculation cycle detector, executed by the processor, which detects a calculation cycle of the target air volume for the target air volume calculator,
    wherein the memory stores, as the history, a value of a change rate of the target air volume corresponding to a fixed cycle converted using the calculation cycle.

10. The engine control apparatus according to claim 4 further comprising:
    a calculation cycle detector, executed by the processor, which detects a calculation cycle of the target air volume for the target air volume calculator,
    wherein the memory stores, as the history, a value of a change rate of the target air volume corresponding to a fixed cycle converted using the calculation cycle.

11. The engine control apparatus according to claim 8 further comprising:
    a calculation cycle detector, executed by the processor, which detects a calculation cycle of the target air volume for the target air volume calculator,
    wherein the memory stores, as the history, a value of a change rate of the target air volume corresponding to a fixed cycle converted using the calculation cycle.

12. The engine control apparatus according to claim 2, wherein the controller includes,
    a fuel controller which controls the fuel injection rate of the engine on the basis of the estimated air volume.

13. The engine control apparatus according to claim 3, wherein the controller includes,
    a fuel controller which controls the fuel injection rate of the engine on the basis of the estimated air volume.

14. The engine control apparatus according to claim 4, wherein the controller includes,
    a fuel controller which controls the fuel injection rate of the engine on the basis of the estimated air volume.

15. The engine control apparatus according to claim 5, wherein the controller includes,
    a fuel controller which controls the fuel injection rate of the engine on the basis of the estimated air volume.

16. The engine control apparatus according to claim 8, wherein the controller includes,
    a fuel controller which controls the fuel injection rate of the engine on the basis of the estimated air volume.

17. The engine control apparatus according to claim 9, wherein the controller includes,
    a fuel controller which controls the fuel injection rate of the engine on the basis of the estimated air volume.

18. The engine control apparatus according to claim 10, wherein the controller includes,
    a fuel controller which controls the fuel injection rate of the engine on the basis of the estimated air volume.

19. The engine control apparatus according to claim 11, wherein the controller includes,
    a fuel controller which controls the fuel injection rate of the engine on the basis of the estimated air volume.

20. The engine control apparatus according to claim 2, wherein the controller includes,
    an ignition controller which controls the timing of ignition of the engine on the basis of the estimated air volume.

\* \* \* \* \*